March 12, 1940. T. UYEHARA 2,193,308
CULTIVATING MACHINE
Filed July 10, 1939 2 Sheets—Sheet 1
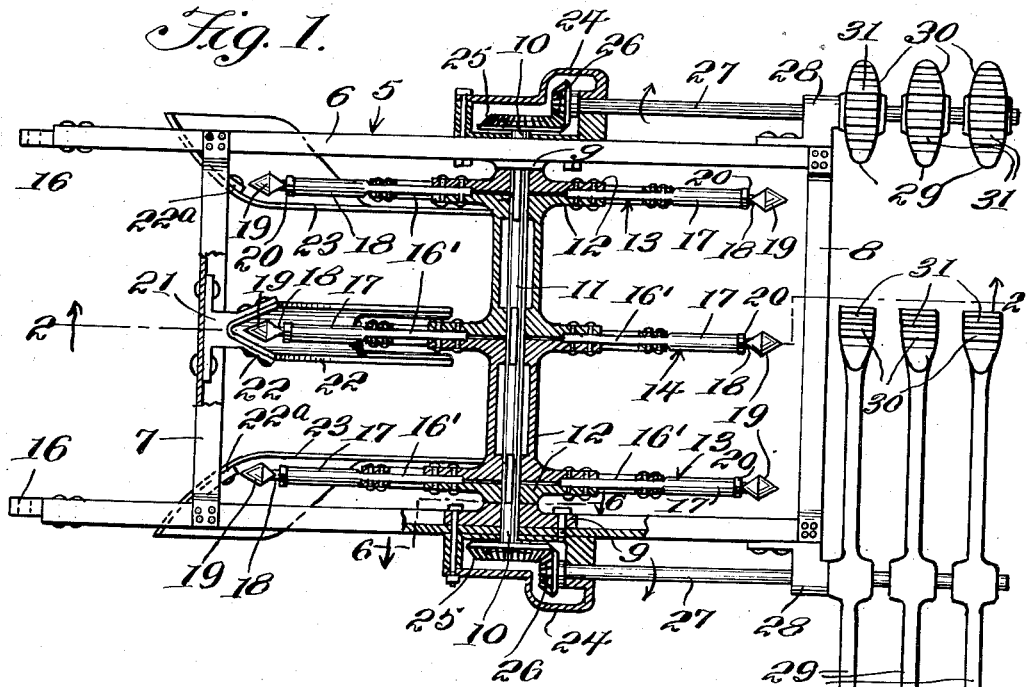
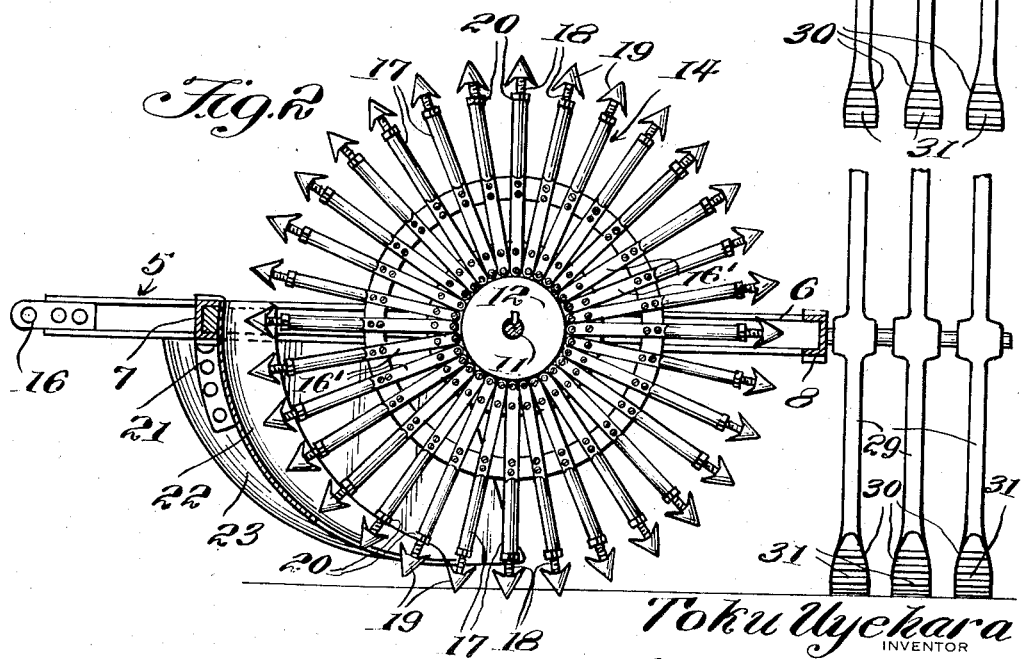

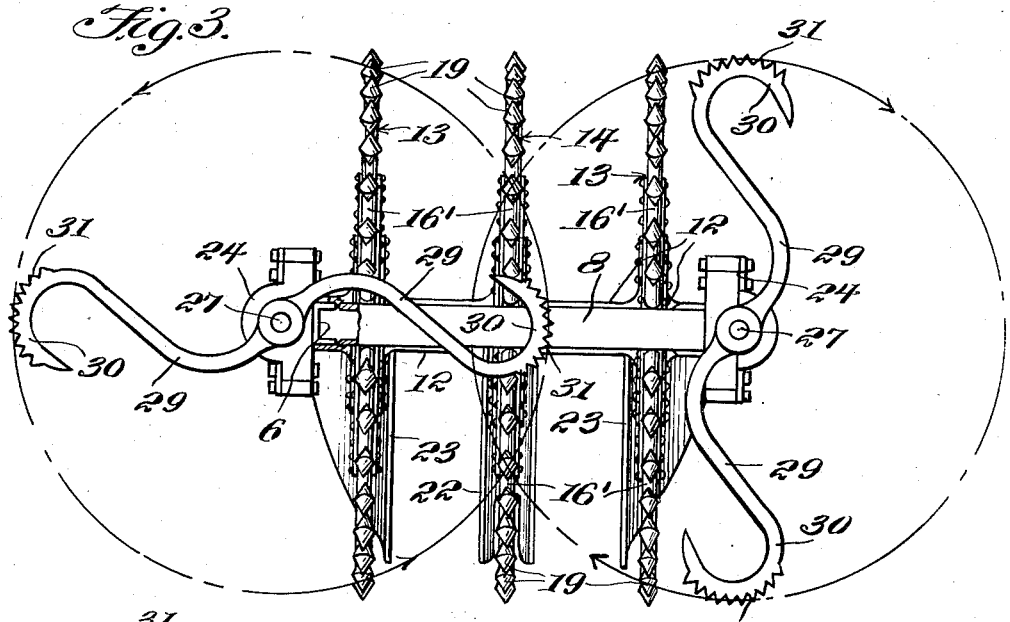
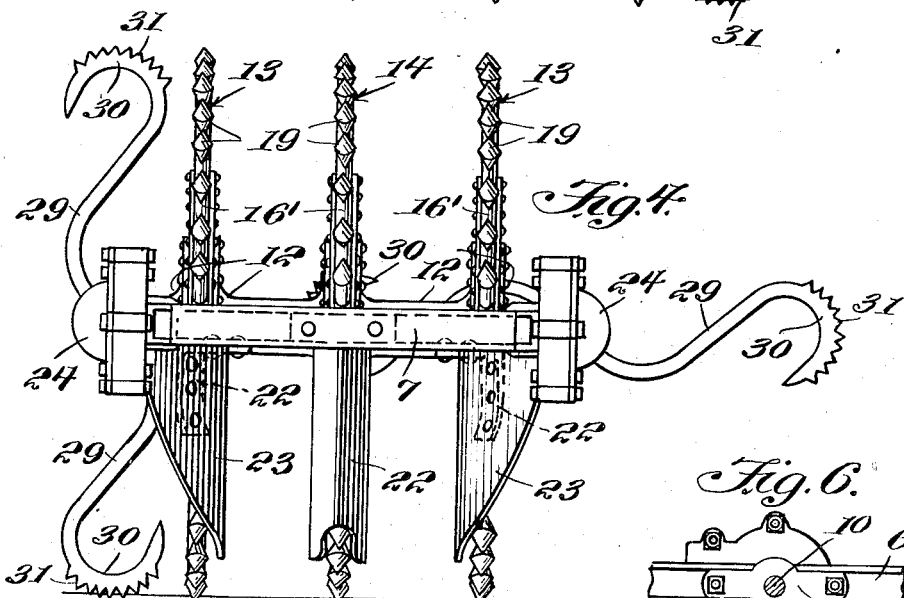
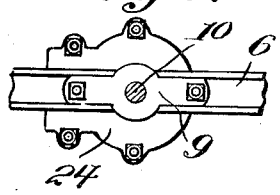
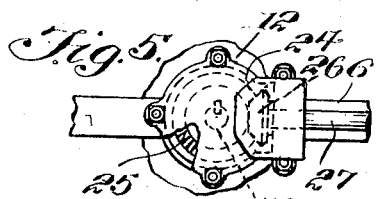

Patented Mar. 12, 1940

2,193,308

UNITED STATES PATENT OFFICE 2,193,308

CULTIVATING MACHINE

Toku Uyehara, Paauilo, Territory of Hawaii

Application July 10, 1939, Serial No. 283,663

1 Claim. (Cl. 97—38)

My invention relates to cultivating machines and more particularly to that class utilized in the cultivation of sugar-cane and the like.

In the growing of sugar-cane, it is a common practice, in the early springtime, to sever the stumps or short stalks, usually known as "stubble", of the previous crop of cane close to the soil in preparation for the next crop. When the stubble is thus treated, it is desirable that the soil, which surrounds and covers the stubble and which, during the winter season, has become solidly and firmly packed down by lapse of time and by tramping, be loosened up and pulverized so that air and sun may have free access to the stubble and thereby promote the growth of the young sprouts of sugar-cane. Furthermore, it is desirable that during the growth of the cane the soil between the rows thereof be weeded and pulverized. Therefore, it is one of the principal objects of my invention to provide a cultivating machine equipped with means for effectively loosening and pulverizing the soil about the stubble and also for cultivating and weeding the soil during the growth of the cane.

Another object of my invention is to provide a machine of the above described character which is simple in construction, durable in use, efficient in operation and economical in manufacture.

Other objects and advantages will be apparent from the following description, appended claim and annexed drawings.

Referring to the drawings wherein like reference characters designate like parts throughout the several views:

Figure 1 is a top plan view, partly in section, of my invention.

Figure 2 is a sectional view taken on the line 2—2 of Figure 1.

Figure 3 is a rear elevation of my novel form of cultivating machine.

Figure 4 is a front elevation thereof.

Figure 5 is a detail side elevation of one of the gear housings.

Figure 6 is a detail sectional view taken on the line 6—6 of Figure 1.

In practicing my invention I provide a frame 5 having longitudinal side members 6 connected together in spaced relation by front and rear transverse members 7 and 8 respectively. The side members 5, between said transverse members 7 and 8, are provided with bearings 9 in which are journaled the ends 10 of a shaft 11 on which is fixed the hubs 12 of outer and intermediate cultivating units 13 and 14, respectively, and which support the frame above the ground. The front ends of the member 6 are provided with clevises 16 for attachment to a suitable draft means (not shown) for operating the device.

Each cultivating unit comprises bars 16' having inner ends bolted to the hubs for rotation therewith and with outer ends bolted to the inner ends of tubular members 17. The tubular members 17 are interiorly threaded and receive through their front ends the inner threaded ends of rods 18, the outer ends of the latter being of an arrow-headed configuration as at 19. The rods 18 are threadedly adjustable with respect to the tubular members and are provided with lock nuts 20 for engagement with the ends of said tubular members whereby to secure said rods in a desired adjusted position.

Connected to the front transverse member 7 is a bracket 21 to which is secured a V-shaped guard 22 subjacently arranged with respect to the frame 5 and having sides embracing the lower section of the intermediate cultivating unit 14. Secured to the ends of the front transverse member 7, by means of brackets 22a, are arcuate shaped guards 23 which are arranged subjacent the frame 5 and extend about the inner sides of the lower portions of the units 13.

The ends of the shaft 11 extend beyond the bearings 9 and terminate within gear housings 24 mounted on the outside lateral faces of the longitudinal side members 6. The ends of the shaft 11 having fixed thereto bevel gears 25 meshing with similar gears 26 fixed to the inner ends of shafts 27 journaled in said gear housings 24 and extending at right angles relative to the shaft 11. The outer ends of the shafts 27 are journaled in bearings 28 carried by the rear ends of the frame 5 and said outer ends extend an appreciable distance rearwardly of the frame and each has fixed thereon a group or ternary of substantially S-shaped members 29.

The outer faces of the outer loop portions 30 of said members 29 are provided with teeth 31 for effecting weeding and breakage of the soil between the rows of cane. One group or ternary of the members 29 are arranged at approximately an angle of 90° with respect to the other group for synchronized rotation therewith whereby they alternately bisect the plane in which the intermediate unit 14 is rotatably disposed.

In operation, the device is drawn through rows of cane by suitable draft means causing rotation of the units 13 and 14. When the units 13 and 14 are rotated the guards 22 and 23 engage the cane and move or bend the stalks thereof out of the path of said units thereby precluding injury to the cane by the units. When the units are rotated the members 29 are likewise rotated and in a direction opposite to each other through the medium of shaft 11, gears 25 and 26 and shaft 27. Rotation of the members 29 causes the outer loop portions thereof to engage the ground to effect weeding thereof and also loosen the soil about the stubble and stalks as the case may be.

It is obvious that the invention is not confined to the herein described use therefor as it may be utilized for any purpose to which it is adaptable. It is therefore to be understood that the invention is not limited to the specific construction as illustrated and described, as the same is only illustrative of the principles of operation, which are capable of extended application in advance forms, and that the invention comprehends all construction within the scope of the appended claim.

What I claim is:

A machine of the class described, comprising, a frame, a transverse shaft rotatably mounted on said frame, a plurality of cultivating units fixed to said shaft for effecting rotation of the latter, said units having adjustable soil engaging sections for penetrating and cultivating the soil, guards carried by said frame and disposed in front of said units whereby to move cane and the like out of the path of said units during operation of the latter, a pair of shafts rotatably mounted on said frame and operably connected to said first mentioned shaft, and groups of substantially S-shaped soil weeding and pulverizing members fixed to said pair of shafts respectively and operable in planes right angularly related to the planes in which said units operate.

TOKU UYEHARA.